United States Patent [19]

Torrance et al.

[11] Patent Number: 5,620,364
[45] Date of Patent: Apr. 15, 1997

[54] WATER-DRIVEN ROTARY TOOL

[76] Inventors: Laura C. Torrance, 801 Azalea St., Boca Raton, Fla. 33486; James J. Castanza, 1590 SW. Albatross Way, Palm City, Fla. 33490

[21] Appl. No.: 339,566

[22] Filed: Nov. 15, 1994

[51] Int. Cl.$^6$ ........................................ B24B 23/00
[52] U.S. Cl. ............................ 451/359; 173/DIG. 1; 451/295; 451/344
[58] Field of Search ........................ 451/359, 353, 451/344, 259, 294, 295, 451; 173/216, 218, 168, 169, DIG. 1, DIG. 4

[56] References Cited

U.S. PATENT DOCUMENTS

| | | | |
|---|---|---|---|
| 2,077,693 | 4/1937 | Herrero | 451/295 |
| 3,287,859 | 11/1966 | Leveque | 451/359 |
| 3,695,367 | 10/1972 | Catterfeld et al. | 173/DIG. 1 |
| 3,722,147 | 3/1973 | Brenner | 451/359 |
| 3,826,045 | 7/1974 | Champayne | 451/359 |
| 4,526,239 | 7/1985 | Kaneda et al. | 173/DIG. 1 |
| 4,930,264 | 6/1990 | Huang | 451/359 |
| 5,323,560 | 6/1994 | Wen | 451/359 |
| 5,445,558 | 8/1995 | Hutchins | 451/344 |

*Primary Examiner*—James G. Smith
*Assistant Examiner*—Dona C. Edwards
*Attorney, Agent, or Firm*—Malin, Haley, DiMaggio & Crosby, PA

[57] ABSTRACT

A multi-purpose water-driven rotary tool having improved torque that has a housing with first and second cavities, one of the cavities housing an impeller, the other housing a main drive shaft connected to a rotatable mounting pad or backing pad that contains a disk with a grinding or sanding surface that is removably attached thereto. The high pressure water inlet conduit includes a changeable nozzle to allow using the tool with different water sources. Water is strategically diverted through a bearing mounting plate having holes by a shroud having an angular periphery or angular flange that allows the expended water from the impeller to be efficiently expelled peripherally around the outside of the main cavity of the housing. The device also includes a manually-actuated trigger for the inlet water valve which can be held at the same time with a saddle handle that is pivotal that allows the user to effectively move the device comfortably to a desired working position.

6 Claims, 3 Drawing Sheets

WATER-DRIVEN ROTARY TOOL

BACKGROUND OF THE INVENTION

1. Field of the Invention

This invention relates to a water-driven rotary tool associated with wet grinding, wet polishing, or wet sanding of many surfaces, including stone, cement, fiberglass, wood and metal surfaces, wherein the tool is used in a water filled or water containing environment, and specifically to an improved water-driven grinder and sander that has improved efficiency and higher torque and is easy to manipulate when in use.

2. Description of the Prior Art

Hydraulic driven rotational tools are known in the prior art. U.S. Pat. No. 1,905,424 issued to R. Schlieper, dated Apr. 25, 1933, shows a hydraulic driven washing apparatus which is a cleaning apparatus for cars that uses a garden hose to provide rotary motion to a sponge. U.S. Pat. No. 4,193,228 issued to Bowler, dated Mar. 18, 1980, provides a water-driven tool that can be used for polishing tile around a swimming pool or shower in a water environment. U.S. Pat. No. 4,463,525 issued to Sheber, dated Aug. 7, 1984, shows a hand-held cleaning tool with a remote water turbine power source contained in a floating housing. The outlet of the water turbine is connected to one end of a suction hose. A flexible drive cable assembly has one end connected to the cleaning tool and the other end connected to the water turbine.

One drawback of liquid-driven rotary tools shown in the prior art is that they do not produce sufficient torque to do a satisfactory grinding and sanding job. Another problem with the tools shown in the prior art is that they are awkward and uncomfortable to hold in position while in use.

The present invention overcomes these problems by providing a high torque water-driven sander and grinder. The device can be specially adapted for a plurality of uses within an already water filled environment such as a pool where it would not be practical to provide electrical power directly to the tool itself. Although electric motors do provide the high torque necessary for certain sanding and grinding operations, their use under water is totally impractical due to the dangers of electrocution and the inoperability of the motor in a totally enclosed environment. Therefore, the use of a high torque rotary power source for wet grinding or wet polishing of stones, cement, fiberglass and even wood and metal surfaces in a water filled or water containing environment is desirable. Such tools may be polishers, grinders, cutting tools, polishing and grinding disks, cutting disks and blades and possibly other uses for pumps, engines, cement mixes and grouts.

The present invention provides for high torque while at the same time providing a housing that includes a handle and trigger mechanism which allows for easy manipulation while the tool is being used, as well as providing ease of turning the device on and off.

In the device shown in U.S. Pat. No. 1,905,424 to R. Schlieper, the water impacting the turbine is deflected out through holes in sponges that are used to wash a vehicle. The disk shown in U.S. Pat. No. 4,193,228 to Bowler protrudes outwardly from the impeller housing and is disposed away from the housing itself. In the present invention, the sanding disk or grinding disk is removably mounted to a disk plate which is close into the housing for increased torque and mobility of the unit. The water used to drive the turbine is strategically diverted so as to maximize torque created by the inlet water spray on the turbine allowing the sanding and grinding disk to be close into the housing.

SUMMARY OF THE INVENTION

A water-driven rotary tool for sanding or grinding in a water filled environment, comprising a substantially annular rigid metal housing that includes an elongated inlet conduit for receiving water under pressure, a saddle-shaped, pole-attaching handle pivotally affixed to the outside of the housing, and a large circular backing pad mounted on one side that can receive thin disk-shaped throw-away sanding or grinding surfaces that are attached to the backing pad surface which is rotated to effect sanding or grinding.

Affixed to the inlet conduit of the housing is a water inlet valve that includes a hand-actuated trigger and valve handle assembly that allows the device to be turned on and off through controlling of the inlet water pressure and flow from the hand-actuated valve.

The pivotal saddle-shaped handle has a hand-sized cylindrical protrusion sized for grasping by the hand, which also includes a hollow cylindrical threaded portion for affixing a pole to the saddle-shaped handle.

The housing includes a first large cylindrical cavity which receives the annular disk-shaped backing pad. The housing also includes a second smaller, deeper cylindrical cavity which is in fluid communication with the water inlet conduit. The second cylindrical cavity contains a circular impeller having a plurality of radially disposed blades around its periphery and a central aperture that receives an impeller shaft that is keyed (locked) to the impeller, a pair of impeller shaft spacers, and a pair of bearings, one attached to each end of the impeller shaft. A drive gear is also keyed or locked to the impeller shaft.

The housing first large cylindrical cavity contains the rotatable backing pad, a drive shaft having a keyed (locked) driven gear connected at one end to the backing pad and at the other end to a recess in the housing wall that includes a bearing. A circular disk-shaped bearing support plate is fixedly mounted inside the first large cylindrical cavity. A drive shaft bearing is mounted to the support plate as is the impeller bearing. A disk-shaped shroud having an angled peripheral edge diverter flange, slightly larger than the diameter of the backing pad which is also attached to the bearing support plate. The housing includes a small recessed portion that receives one of the bearings for the driven gear shaft. The driven gear is interlocked with the drive gear for rotation with the gear shaft. When the driven gear rotates by action of rotation of the drive gear attached directly to the impeller, the driven gear rotates the gear shaft to which the backing pad is attached, causing the tool to operate to allow rotation of a thin sanding or grinding disk attached to the front face of the backing pad.

The water inlet conduit which is formed with and protrudes from the upper portion of the housing includes a changeable nozzle for accelerating inlet water under pressure and is directionally oriented so that the output of the nozzle allows water to strike the impeller blades near their radial ends, causing high torque on the impeller. Different nozzles having different sized inside diameters can be used with different water pressure sources to maintain a constant impeller RPM resulting in a constant tool output RPM. By having changeable nozzles, the tool can be used with existing high pressure water sources of different pressure values, to operate the tool at a single desired RPM rate for maximum efficiency.

The bearing support plate has a plurality of strategically spaced holes or passages therethrough to allow water, after it strikes the impeller blades, to flow through the bearing support plate and thereafter to flow into contact with the shroud. Water is forced outwardly by the shroud and passes between the large housing cavity periphery and the shroud, where the water escapes.

The backing pad is threadably connected to the driven gear shaft. The shroud is attached by a plurality of fasteners to the bearing support plate.

The housing includes a small recess, sized in diameter to receive one bearing that is used for the impeller shaft. The opposing impeller shaft bearing is mounted within a recess in the bearing support plate.

The saddle handle is basically U-shaped and has a pair of apertures, on each at the end of each U-shaped portion that receives a connecting screw and washer and allows the saddle handle to be attached to the outside of the housing diametrically for pivoting to allow positioning of the tool by the user. The saddle handle also includes a threaded socket portion to receive the male threaded end of a pole so that the device can be used with a pole.

The water inlet control valve has a valve actuating lever that can be squeezed with a person's hand. Water received from a high pressure source such as a pump above 1000 psi, comes through the inlet conduit and nozzle, strikes the impeller, causing the drive gear to rotate as the impeller rotates which in turn rotates the driven gear rigidly attached to the gear shaft. The water that is expended against the impeller blades is diverted under pressure through holes in the bearing support plate against the shroud which directs the water outwardly to the peripheral of the housing large cavity wall and periphery where the water is expelled efficiently, away from the housing, around the backing pad. This reduces back pressure and allows for increased torque in the device.

In a typical operating environment such as a pool filled with water, a sanding or grinding disk is affixed to the front surface of the backing pad. A gas-powered motor may provide the necessary drive power for a water pump which allows water to be pumped directly to the inlet conduit through quick disconnect that allows the device to be connected to a conduit that has the pressurized water source. The manual valve can be turned on while the tool is being held by the saddle handle and the valve actuating handle so the backing pad and grinding or sanding disk will rotate with high torque. The device can be safely used underwater while still maintaining a high torque output. Note that the bearings for both the impeller shaft and the gear shaft are rigidly mounted to the housing and to the backing plate which itself is firmly mounted in position to the housing. The device can also be used in a dry environment to reduce dust particles using the water that is sprayed from the tool while grinding or sanding.

It is an object of this invention to provide an improved water actuated rotary tool of high torque especially used for grinding, scraping or polishing within a dry or water filled or water surrounding environment without danger of electrical shock. Another object of this invention is to provide an improved rotary water actuated tool that provides for high torque and easy manipulation in use, and a water spray for reducing dust.

And yet another object of this invention is to provide a water activated rotary tool for grinding, polishing and scraping especially for use in a pool that provides for expended water to be diverted peripherally and centrifugally from the device.

In accordance with these and other objects which will become apparent hereinafter, the instant invention will now be described with particular reference to the accompanying drawings.

BRIEF DESCRIPTION OF THE DRAWINGS

FIG. 4 shows a top plan view of the saddle handle.

DESCRIPTION OF THE PREFERRED EMBODIMENTS

Figure 1:
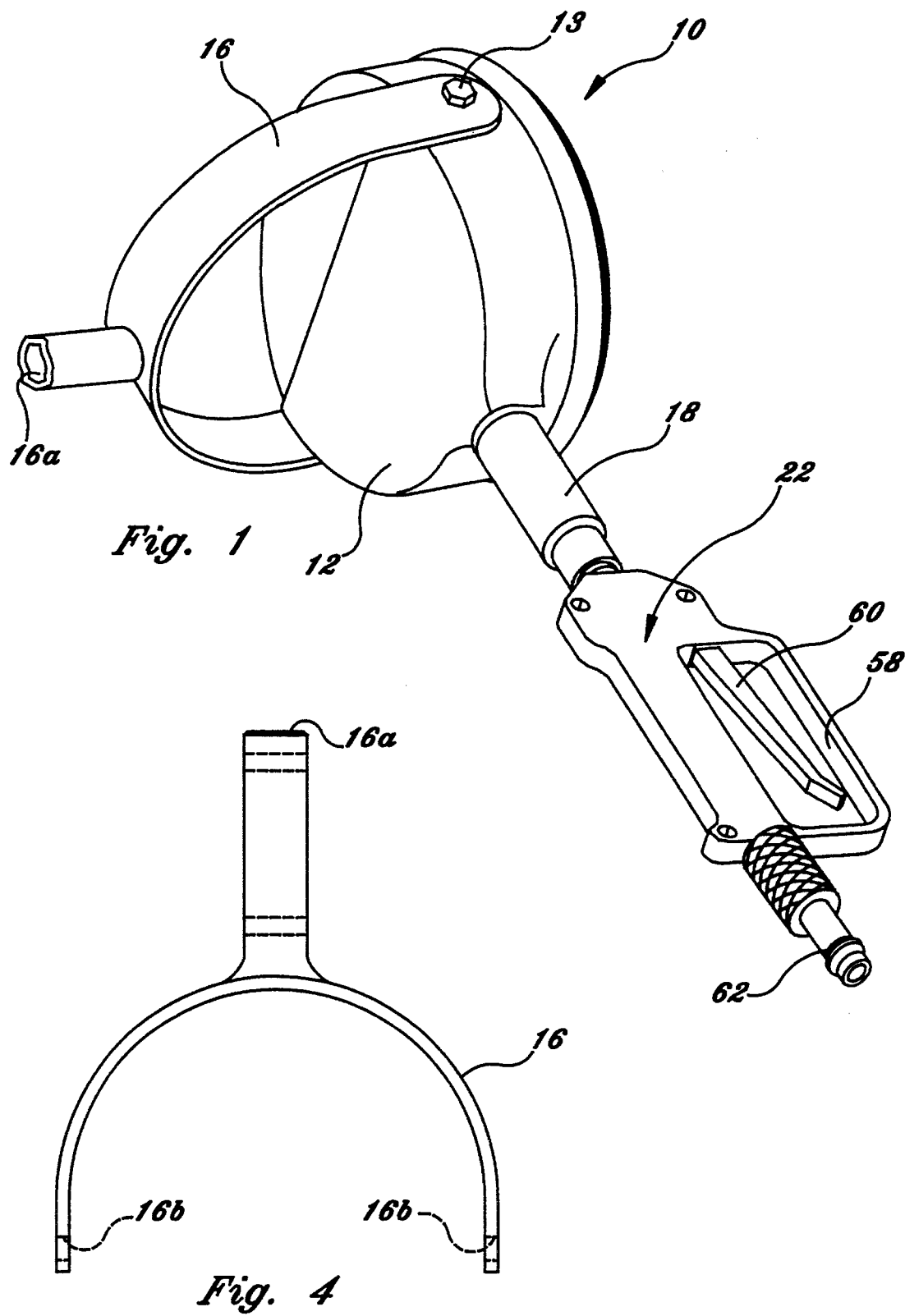
FIG. 1 shows a perspective view of the present invention.

Referring now to the drawings and in particular, to FIG. 1, the present invention is shown generally at 10, comprised of a rigid annular metal housing 12 having a saddle-shaped handle 16 attached pivotally thereto by bolt 13, the housing 12 including a water inlet conduit 18 that allows water to flow under pressure into a second cavity inside the housing, described below.

A water inlet valve 22 is connected at its output side to the water inlet conduit 18 and at the other end has a quick disconnect conduit release 62 that allows the valve 22 to be connected to a source of water under pressure through the quick disconnect 62. The valve 22 includes a manually actuated handle lever arm 60 that activates the water inlet valve set forth in a handle casing 58 that allows the user to manually grasp the valve actuating lever arm 60 for squeezing while the hand is mounted on the entire assembly to turn the water pressure on or off (by release) through manipulation of the lever arm 60. The operation of the water inlet valve 22 is conventional.

Figure 2:
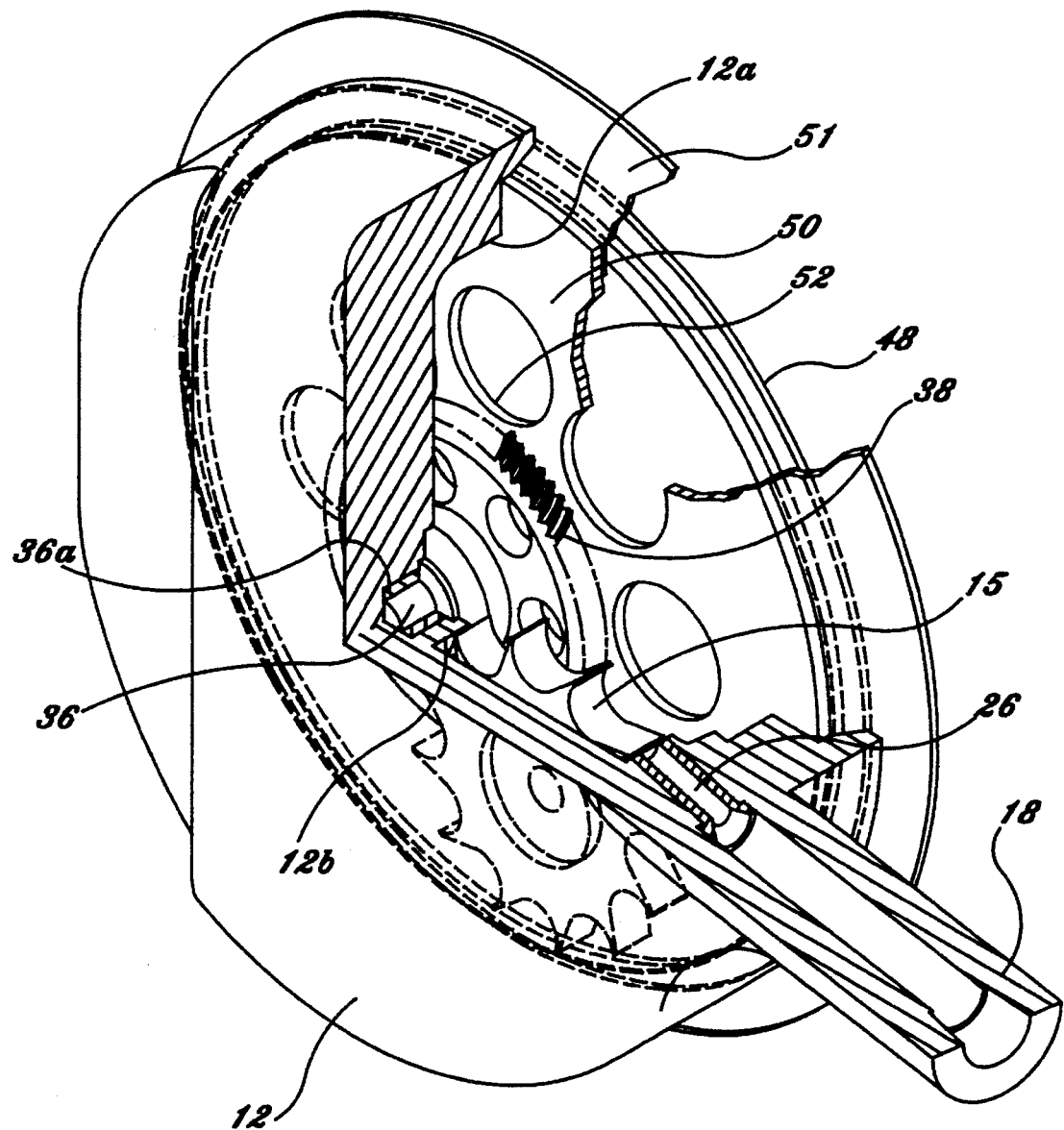
FIG. 2 shows a perspective view of the invention partially cut away in cross-section.

Referring now to FIG. 2, the annular rigid housing 12, which is preferably constructed of metal, includes a first large internal cylindrically-shaped cavity 12a and a smaller second cylindrically-shaped cavity 12b. The cylindrical cavity 12b in the housing 12 is offset from the central axis of the large cavity 12a and is in fluid communication with a removable, replaceable nozzle 26 that is disposed within water inlet conduit 18 so that water coming through the inlet conduit 18 passing through nozzle 26 strikes an impeller 15 having impeller blades radially disposed about its periphery that is rotatably mounted within the second cylindrical cavity 12b. The impeller 15 is mounted on and keyed to a shaft, each connected to a pair of bearings, one of which is mounted in housing 12 and the other bearing which is mounted in a bearing support plate 50 which is rigidly mounted to housing 12. Also mounted to the impeller shaft is a drive gear that is keyed to the shaft so that as the shaft turns and the impeller turns, the drive gear will turn. The bearing support plate 50 includes a plurality of large circular apertures or holes 52 that allow water to pass through when the water is diverted by pressure to the outside edge of housing 12 around its periphery, directed by a shroud 56, explained in detail below.

Nozzle 26 is mounted at the outlet of water inlet conduit 18. Nozzle 26 is removable and may be "popped out" of the channel by a screwdriver or the like and replaced with a different nozzle that has a smaller or larger inside diameter to change the force of the inlet water under pressure that strikes the impeller 15. The purpose of a changeable nozzle 26 is that it allows the present invention to be used with numerous different existing high pressure water sources such as high pressure water cleaners that may vary in pressure from 2000 to 3000 PSI. A different pressure source such as between 2000 PSI and 3000 PSI would result in a different RPM of the grinding or sanding surface utilizing the present invention. By having a variable nozzle inside diameter, a more constant RPM can be obtained with the tool, regardless of the different value of the incoming water pressure. Each nozzle has an annular lip at one end that holds it in place, which also allow the entire nozzle to be "popped out". The nozzle may be made of stainless steel or brass, each with the same outside diameter and annular fitting flange at one end with different and varying inside diameters for changing the flow rate and pressure for variable input pressures.

The large first main cylindrical cavity in housing 12 is circular and has its circular center approximately in the center of the housing. A shaft 36 and bearing 36a are mounted centrally and anchored in one end in housing 12 and is connected on the other end to the bearing support plate 50. Attached to the shaft 36 is a driven gear 38 which meshes with the drive gear attached to the impeller shaft so that when the drive gear rotates, the driven gear will rotate, rotating the main drive shaft. The main drive shaft is threadably connected to a disk that is a backing pad that rotates when the drive shaft rotates. A retainer is used to connect threadably the backing pad to the drive shaft, coupling the backing pad firmly thereto. The backing pad forms the working surface of the tool that rotates and has affixed thereto to one face a throw-away grinding or sanding disk much like sandpaper that is the actual working implement. Thus, the backing pad is the main portion that is rotated with high torque so that a disk attached to its surface can be used as the working tool surface. This is where the grinding and sanding action takes place against the throw-away disk. The main drive shaft axle has bearings mounted in the housing and in the bearing support plate. The driven gear is keyed or locked to the shaft so that as the driven gear is rotated by the impeller drive gear, the shaft rotates, causing the backing pad to rotate, allowing the device to work. The shroud is a disk-shaped member having a divergent peripheral edge that is angled outwardly, as is the outer peripheral lip of the housing cavity so that water is directed outwardly from the main cavity along the edge of the shroud which directs the fluid flow out the peripheral edge of the housing first main cavity.

Figure 3:
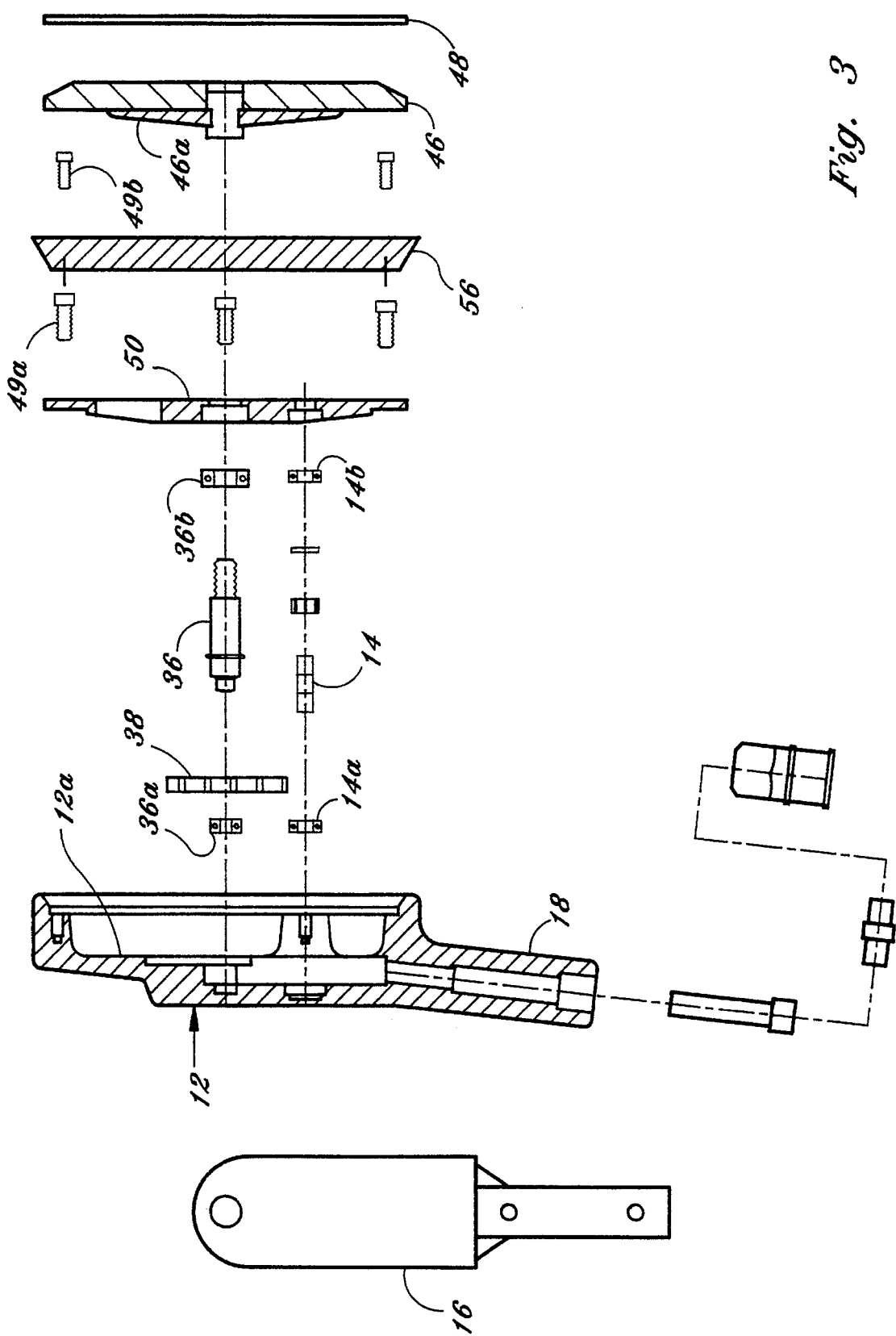
FIG. 3 shows an exploded view partially in cross section of the present invention.

FIG. 3 shows the relationship structurally of the components utilized in the device in an exploded view. The housing 12, and in particular the large cylindrical cavity 12a, receives the drive axle 36 which has a bearing 36a mounted in the housing recess at one end and a second bearing 36b mounted to the bearing support plate 50 at the other end or in the middle section. The end of the axle 36 includes a threaded portion that allows it to be attached firmly to the backing pad with a retainer 46a.

A sanding or grinding disk 48 is removably attachable to one face of the backing pad 46 to allow for operation of the device.

The bearing support plate 50 is fixedly mounted together with a disk-shaped shroud 56 having an angled flange 51 along its outside periphery to the inside of the first cylindrical cavity by threaded fasteners 49a and 49b. The shaft or axle 36, which is the main driven shaft, rotates while the shroud and bearing support plate 54 and 50, respectively, do not rotate.

The driven gear 38 is keyed or locked to axle 36 so that when the driven gear 38 rotates, axle 36 also rotates, causing the backing pad 46 and disk 48 to rotate.

In the smaller cylindrical cavity 12b in the housing that is in direct fluid communication to the outlet of the nozzle 26 is mounted the impeller which is keyed to the impeller shaft 14 and drive gear 30 which is also locked to the impeller shaft 14, with the impeller shaft 14 having a pair of impeller shaft bearings 14a, one at each end, one mounted in the housing 12 and the other mounted in the bearing support plate 50.

The bearing support plate 50 has a plurality of apertures 2 (shown in FIG. 2) to allow water to pass from the smaller cavity where the impeller is mounted to the larger cavity and outwardly around the edge of the outer cavity periphery where the water is expelled quickly and efficiently by shroud 56. With the bearing structure and rigid support back plate and shroud 56, the device is capable of high torque action safely and conveniently.

FIG. 4 shows a U-shaped or saddle handle 16 that is pivotally connected on each side of the outside of housing 12 that allows it to be rotated to a desired position with the handle itself having a threaded female opening 16a that allows it to be attached to threaded male pole.

The valve mechanism 22 (FIG. 1) is thus used to control the water flow and rotation of the backing pad device.

To operate the invention, the valve mechanism 22 is manually turned on after the device has been connected to a source of high pressure water from a suitable pump, preferably above 1000 psi. Once the manual trigger is actuated, the backing pad and of course the disk that has been attached thereto that has the sanding or grinding surface material will begin to rotate. The operator can utilize the device safely in a water-filled environment or dry environment to reduce sanding and grinding particles and can move the saddle handle in conjunction with the other handle to just about any location for ease of operation of the device. Although shown for grinding or sanding, the device is capable of other operations suitable for a rotatable tool that can be used at high torque.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A water-driven hand tool, comprising:

a main housing having a first cylindrical cavity having a periphery and a second cylindrical cavity, said first and second cylindrical cavities spacially offset from each other;

a water-driven impeller mounted rotatably in said housing second cylindrical cavity;

a main housing inlet conduit connectable to a water supply under pressure, and in fluid communication with said impeller to rotatably drive said impeller, said housing inlet conduit including a first nozzle;

an axle rotatable and centrally mounted for rotation in said main housing;

a driven gear fixedly connected to said axle;

an annular backing pad connected to said axle to be rotated thereby;

an impeller drive shaft connected to said main housing and to said water driven impeller, said impeller drive shaft and said axle offset from each other;

a drive gear fixedly connected to said impeller drive shaft, said drive gear rotatably engaged with said driven gear;

a disposable working disk for sanding or grinding attached supportively and removably to said backing pad;

a shroud having a substantially annular flange around its periphery, said shroud sized to fit in said housing first cylindrical cavity with predetermined spacing between the housing first cylindrical cavity periphery and the shroud annular flange for efficient water expulsion for deflecting water away from said backing pad; and a bearing support plate having relatively large apertures disposed therein, said bearing support plate connected to a bottom surface of said shroud, such that the water that is used to drive said water driven impeller is able to flow through the support plate apertures to a peripheral edge of said shroud and escape through centrifugal action.

2. A water-driven hand tool as recited in claim 1, further comprising a first handle connected to said main housing, said first handle being substantially parallel to said axle.

3. A water-driven hand tool as recited in claim 2, further comprising a second handle connected to said main housing, said second handle being substantially perpendicular to said first handle.

4. A water-driven hand tool as recited in claim 3, wherein said second handle is in fluid communication with said main housing inlet, said second handle including valve opening and closing means for regulating the flow of water therefrom and to shut off the flow of water.

5. A water-driven hand tool as recited in claim 4, wherein said valve opening and closing means is a trigger.

6. A water-driven hand tool as in claim 1, wherein said first nozzle is removable and including a second nozzle of a different inside diameter than said first nozzle, said changeable nozzles allowing for the use of high pressure water sources of different pressure to obtain the same tool operational RPM.

* * * * *